Figure 1:
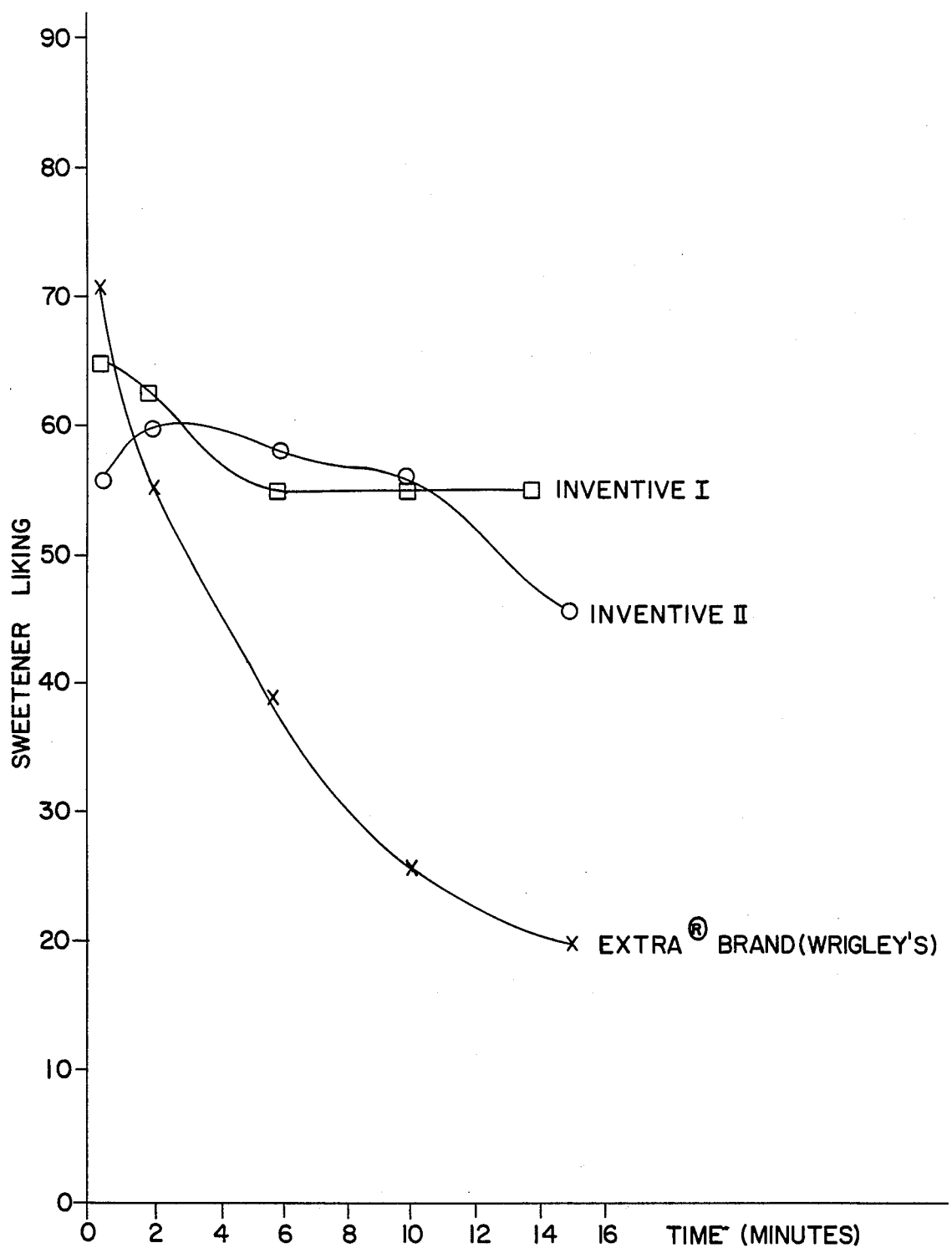

United States Patent [19]

Cherukuri et al.

[11] Patent Number: 4,816,265

[45] Date of Patent: Mar. 28, 1989

[54] SWEETENER DELIVERY SYSTEMS CONTAINING POLYVINYL ACETATE

[75] Inventors: Subraman R. Cherukuri, Towaco, N.J.; Gul Mansukhani, Staten Island, N.Y.

[73] Assignee: Warner-Lambert Company, Morris Plains, N.J.

[21] Appl. No.: 945,743

[22] Filed: Dec. 23, 1986

[51] Int. Cl.$^4$ ........................ A23G 3/30; A23L 1/236; A23L 1/22
[52] U.S. Cl. .......................................... 426/5; 426/96; 426/99; 426/548; 426/302; 426/303
[58] Field of Search ................ 426/3, 4, 5, 99, 96, 426/94, 103, 302, 303, 548, 658

[56] References Cited

U.S. PATENT DOCUMENTS

| | | | |
|---|---|---|---|
| 3,826,847 | 7/1974 | Ogawa et al. | 426/3 |
| 4,329,369 | 5/1982 | Tezuka | 426/3 |
| 4,384,004 | 5/1983 | Cea et al. | 426/99 |
| 4,465,694 | 8/1984 | Okada | 426/548 |
| 4,485,118 | 11/1984 | Carroll et al. | 426/5 |
| 4,490,395 | 12/1984 | Cherukuri et al. | 426/3 |
| 4,515,769 | 5/1985 | Merritt et al. | 426/96 |

*Primary Examiner*—Jeanette Hunter
*Attorney, Agent, or Firm*—Daniel A. Scola, Jr.; Gary M. Nath

[57] ABSTRACT

A chewing gum composition having prolonged sweetness duration through the incorporation of a delivery system comprising a high intensity sweetener encapsulated in a low molecular weight polyvinyl acetate material and an emulsifier.

15 Claims, 2 Drawing Sheets

ENCAPSULATED ASPARTAME

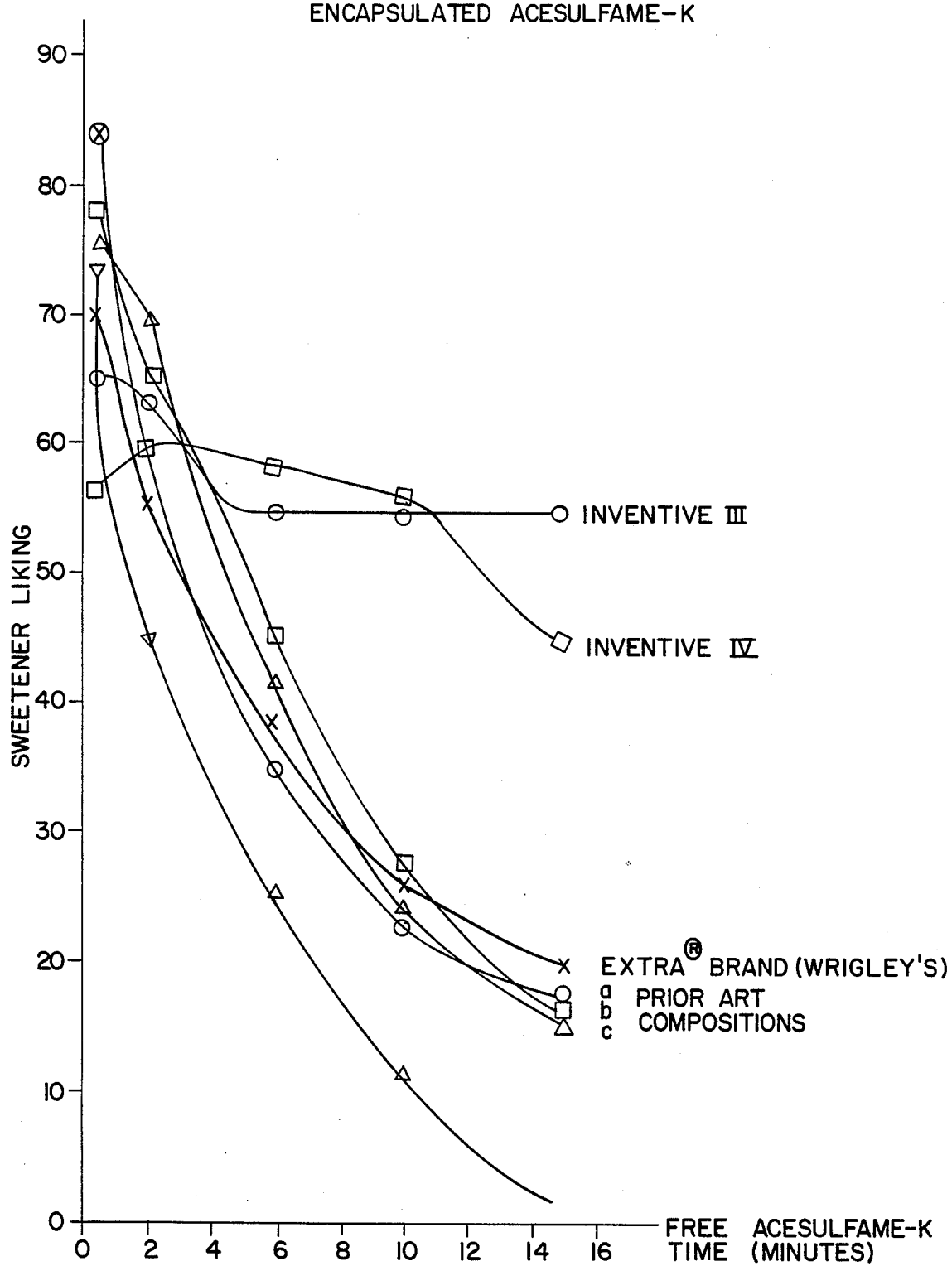

SWEETENER DELIVERY SYSTEMS CONTAINING POLYVINYL ACETATE

FIELD OF THE INVENTION

This invention relates to an artificial sweetener composite designed to be incorporated into chewing gum and confectionery compositions to impart prolonged sweetness. More particularly this invention relates to a method of protecting materials from being adversely affected from such factors as moisture, pH, temperature and reactive chemicals. The delivery system is particularly useful for delivering sweeteners, but may have applications for flavors and drugs and the like.

BACKGROUND OF THE INVENTION

Numerous patents have disclosed coatings for sweeteners in an attempt to delay or prolong sweetness, as well as to stabilize those sweeteners, such as aspartame, which are sensitive to moisture, temperature and pH. U.S. Pat. No. 4,384,004 to Cea et al., discloses solid particles of aspartame encapsulated by a coating material selected from the group consisting of cellulose, cellulose derivatives, arabinogalactin, gum arabic, polyolefins, waxes, vinyl polymers, gelatin, zein and mixtures thereof, wherein the amount of said coating material to said methyl ester is from 1:1 to 1:10. More particularly, the coating materials include cellulose, methyl cellulose, ethyl cellulose, cellulose nitrate, cellulose acetate phthalate, carboxymethyl cellulose, hydroxyethyl cellulose, hydroxypropyl cellulose, arabinogalactan; polyethylene, polymethacrylates, polyamides, ethylenevinyl acetate copolymers, polyvinylpyrrolidone; gum arabic; paraffin wax, carnauba wax, spermaceti, beeswax; stearic acid, steryl alcohol, glyceryl stearate; gelatin, zein and mixtures thereof.

The method of coating employed in this reference includes suspending the aspartame particles in a stream of air that passes through a zone of atomized liquid droplets of the coating material, so that the coating material is deposited on the surface of the aspartame. More than one coating may be used whereby the inner coating is water-soluble and the outer coating is water-soluble.

U.S. Pat. Nos. 4,122,195 and 4,139,939, both to Bahoshy et al., fix aspartame by preparing it with a material such as gum arabic or the reaction product of a compound containing a polyvalent metallic ion, with an ungelatinized start acid-ester of a substituted dicarboxylic acid, by a spray drying technique, where the aspartame and a film former are prepared in an emulsion.

U.S. Pat. No. 4,374,858, to Glass et al., discloses an aspartame sweetened chewing gum having improved sweetness stability wherein the chewing gum piece has aspartame coated on its surface, as opposed to incorporating it in the chewing gum mix.

EPA No. 81110320.0, published June 16, 1982 (Publication No. 0053844), to Ajinomoto Co., Inc., discloses a stabilized dipeptide-based sweetening composition comprising (a) from 20 to 60% by weight of sold fat, (b) from 10 to 30% by weight emulsifier, (c) from 10 to 30% by weight polysaccharide and (d) not more than 30% by weight of dipeptide sweetener. The compositions are prepared by heating the mixture of the ingredients, cooling, and pulverizing to obtain powder or granules of the composition to obtain a ASTM mesh size of smaller than 12. Spray drying the mixture is also disclosed.

U.S. Pat. No. 4,105,801 to Degliotti, discloses a confectionery comprising a core portion and a shell adheringly enveloping the core portion, whereby the shell is formed by an intimate mixture of microcrystals of xylitol with a solid fatty substance in a proportion of 0.5 to 15 parts by weight of fatty substance to each 100 parts by weight of xylitol. The fatty substance is preferably a mono-, di- or triglyceride having a melting range of between 20° and 60° C.

U.S. Pat. No. 3,389,000 to Toyonaka et al., discloses protective coatings for granular nucleoside-5-phosphates, the coatings being edible fats melting between 40°-100° C. and derived from plants and animals. Hydrogenated oils such as soybean oil, cottonseed oil, almond oil, castor oil, linseed oil, mustard oil, olive oil, grapefruit seed oil, palm oil, palm kernel oil, rapeseed oil, rice bran oil and the like and mixtures thereof. This reference discloses a process of preparing the granular product from a liquid mixture of fats and nucleoside-5-phosphates which are sprayed from a pressure nozzle and the resultant granules cooked and recovered.

U.S. Pat. No. 4,382,924, to Berling, discloses liquid oral dosage forms for vitamins or pharmaceutical materials comprising an edible oil, a high potency lipid soluble sweetener such as saccharin and a lipid soluble flavorant. The edible oil may be a polyol fatty acid ester having at least four fatty acid ester groups and each fatty acid having from about 8 to about 22 carbon atoms. The oil, sweetener and flavor oil are mixed and heated and then cooled to provide a palatable liquid dosage form.

For a general discussion of spraying fatty materials onto sweeteners and the like see U.S. Pat. Nos. 3,949,094 and 3,976,794 both to Johnson, and 3,867,556 to Darragh. U.S. Pat. No. 4,293,572 to Silva et al., discloses the application of a dispersion of an emulsified fat with a solution of dextrin. saccharin or a polysaccharide to a food product as a barrier against moisture. U.S. Pat. No. 3,527,647 discloses a process of agglomerating particles by randomly scattering and spraying moistened particles to cause them to collide and form agglomerates.

The problem relating to stabilization of sweeteners such as aspartame, which has not been previously addressed, relates to the wettability of the aspartame crystal as well as to its morphological configuration. Aspartame is known to be rod-like, needle-like or dendritic in shape. As a result it is very difficult to coat aspartame using ordinary mixing or spray coating techniques. To be effective as protective barriers, coatings must be able to wet and adhere to the crystalline surface, including the needle-like tips and other shape variations of the aspartame. Additionally, the coating must be capable of being applied in a film with a uniform thickness sufficient to provide a barrier against degradative factors such as moisture, pH changes, temperature changes and reactive chemicals. The coatings, in addition to being protective barriers, must be flexible enough to conform to the surface irregularities and geometrical configuration without cracking due to mechanical stresses which it is subjected to during incorporation of the sweetener into specific product applications. Attempts to coat aspartame using spray techniques to apply simple mixtures of fat and lecithin have resulted in poor wetting, spotty coating and inadequate protection against moisture and other potentially degradative factors.

It has been discovered that simple mixing of known coating materials such as fats, with certain other core materials such as aspartame does not provide adequate protection to keep the core material in a stabilized state. Fats do not provide adequate coating materials, nor do such coating materials as starch, and certain other materials such as waxes. Many of these materials require solvents and moisture for application, which have adverse effects on the stability of hyrophilic instable materials such as aspartame. For example, simple mixing of aspartame in liquid mixtures of traditional coating materials, e.g., fat and lecithin, has resulted in poor wetting, spotty coating and inadequate protection against moisture and chemicals. The result was degradation of the aspartame upon exposure to these conditions. Changes in pH and temperature catalyze these degradative conditions.

The process of EPA No. 81110320.9 (Publication No. 0053844) filed Dec. 10, 1981, discussed above, is an example of simple admixing of coating materials with aspartame. This publication discloses the simple melting and admixing of from 20 to 60% of solid fat 10 to 30% of emulsifier, 10 to 30% of polysaccharide and not more than 30% dipeptide sweetener. The mixture is then cooled and pulverized or spray dried. The pulverizing into fine powder, however, results in rupturing of the coating, leaving the aspartame exposed. Spray drying is normally associated with the driving off of moisture or solvents.

U.S. Pat. No. 4,597,970 discloses a delivery system wherein a sweetener is coated with a mixture of fatty acid or wax, leithin and monoglyceride. The delivery system of this reference discloses a method of protecting the sweetener as well as providing controlled release.

The instant invention seeks to provide coating compositions which eliminate the need for fatty acid or wax components, yet still provides adequate protection and delayed release of the sweetener or other active contained therein.

The prior art techniques for coating difficult-to-coat materials such as aspartame, has focused on two methods. The first method involves the formation of a molten mixture of the coating material with the sweetener. The mixture is then solidified by cooling and pulverized. The resultant particles represent a random attempt at completely coating or enrobing the sweetener. In the case of aspartame, this coating does not provide adequate protection against moisture or aldehyde-containing flavor oils and instability of the aspartame results.

The second conventional prior art technique for coating materials involves fluidized bed spray coating. This technique involves suspending a mass of the material to be coated into a stream of atomized droplets of coating material. In the case of materials such as aspartame, this method is very difficult. Aspartame is a low density material, has a large surface to weight ratio and poor wetting characteristics. For these reasons, spray coating of aspartame in a fluidized bed system is difficult.

The instant process is an improvement over spray congealing techniques. The resultant product exhibits a marked improvement in the effectiveness of the coating as a protective barrier. The result is a significant improvement in the stability of the core (sweetener) material.

Thus, the delivery systems of the invention and process of preparation provide an improved protective coating for core materials, thereby increasing the stability of the final product. The delivery systems have a variety of other advantages including the controlled release of materials such as sweeteners and flavoring agents. Other advantages will become apparent herein.

SUMMARY OF THE INVENTION

It has been discovered that a sweetener delivery system can be made using a coating formed from the combination of an emulsifier with low molecular weight polyvinyl acetate. This coating provides an effective barrier against moisture and other conditions such as reactive agents, pH changes and the like. When applied to sweeteners such as aspartame, these coatings effectuate sustained release of the sweetener, thereby extending the period of sweetener perception and enjoyment of the chewing gum or confection.

A chewing gum composition having prolonged sweetness duration comprising a gum base and a stable sweetener delivery system capable of effecting a controlled release of the sweetener comprising:

A. At least one solid natural or artificial high intensity sweetener selected from the group consisting of amino acid-based sweeteners, dipeptide sweeteners, glycyrrhizin, saccharin and its salts, acesulfame salts, cyclamates, steviosides, talin, dihydrochalcone compounds and mixtures thereof; and B. An emulsifier present in amounts of about 0.5% to about 20% by weight of the sweetener delivery system and selected from the group consisting of lecithin, esters of stearates, esters of palmitates, esters of oleates, esters of glycerides, sucrose polyesters, polyglycerol esters and mixtures thereof.

C. Polyvinyl acetate present in amounts of about 40% to about 93% by weight of the sweetener delivery system having a molecular weight of about 2,000 to about 14,000 and preferably about 2 to about 12,000.

The invention also contemplates the optional use of waxes selected from the group consisting of animal waxes, vegetable waxes, synthetic waxes, petroleum wax and mixtures thereof.

The combination of polyvinyl acetate and aforementioned emulsifiers produces coatings which form excellent films on the sweeteners. These coatings are substantially water insoluble and thus protect the sweetener or other encapsulated material from hydrolytic degradation. Yet, they possess sufficient hydrophilic character to swell in the presence of water, thereby slowly releasing the core material. Glyceryl monostearate is the most preferred emulsifier because it has been found to have the unexpected property of inhibiting the hydrolysis of polyvinyl acetate to acetic acid and polyvinyl alcohol. Other advantages can be enumerated. For example, the coatings are non-cariogenic; no cold flow of polyvinyl acetate is encountered on prolonged storage; the method of making the delivery system does not employ the use of solvents; the delivery system can be used in any food, chewing gum, confectioners, personal product or pharmaceutical application where it is desirable to protect an artificial sweetener from moisture. Other advantages of the instant invention will become apparent.

The delivery system is prepared by melting the desired ratios of polyvinyl acetate and emulsifier and mixing them at a temperature of about 85° C. for a short period of time, e.g., 5 minutes of more. Once these materials are sufficiently melted and a homogenous mixture is obtained, the proper amount of solid sweetener is added and blended into the molten mass thoroughly for an additional short period of mixing. The resultant mixture is a semi-solid mass which is then cooled to obtain a solid, e.g., at 0° C., and ground to a U.S. standard mesh size of about 30 to about 200 (600–75 microns).

The instant delivery system can be incorporated in a number of ingestible products such as food products, confections and the like, as well as chewing gum compositions, pharmaceutical preparations, denture products, mouthwash and the like.

The resultant product of this invention is in powder or granulated form. The particle size is not critical to the delivery system and can be adjusted to accommodate a particular desired release rate and mouthfeel, depending on the vehicle, e.g., chewing gum, confection or pharmaceutical in which it is incorporated. The product can be used as is for various applications, e.g., as a topping on baked goods or as an additive in a denture adhesive or mouthwash. The coating matrix is useful for a variety of core materials in addition to sweeteners, such as spray dried flavors, drugs and other particulate materials which require a coating for protection, controlled release or for taste-masking.

The core material can be selected form a wide variety of materials such as sweeteners, medicaments, drugs, flavoring agents and the like. These materials can be used either singly or in combination in either a single or multiple delivery system. That is, one or more of these materials may be present within one coating matrix or separately coated by the matrix and employed alone or in combination in a final product.

The sweetener component may be selected from solid natural or synthetic sweeteners capable of imparting high intensity sweetness. These sweeteners are selected from the group consisting of amino acid-based sweeteners, dipeptide sweeteners, glycyrrhizin, saccharin and its salts, acesulfame salts, cyclamates, steviosides, talin, dihydrochalcone compounds and mixtures thereof.

The sweeteners which are part of the delivery system may be used in amounts necessary to impart sweetness and preferably in amounts of about 0.01 to about 30% by weight of the delivery system. Aspartame, saccharin and its salts are the preferred sweeteners and may be used in amounts of about 0.01% to about 50% and about 0.01% to 50% respectively, by weight of the delivery system. The preferred amounts of these sweeteners are about 2 to about 10%, most preferably about 4 to about 6%. Auxilary sweeteners may be used in the final product, i.e., chewing gum composition, in conventional amounts standard in the industry.

A particularly effective combination of sweeteners is aspartame, sodium saccharin and acesulfame K (potassium acesulfame). Saccharin and its salts and acesulfame salts may be employed in amounts of about 5 to about 50% by weight of the delivery system. Aspartame is used in amounts up to about 15% by weight when used in this combination. One or more of the sweeteners may be in the encapsulated form prior to incorporation in the delivery system, thus delaying the release of the sweetener and lengthening the perceptible sweetness and/or staggering their release. Thus, the sweeteners may be incorporated such that they release sequentially.

It has also been discovered that the incorporation of the combination of two or more sweeteners used alone or as part of the delivery system improves the sweetness intensity as a result of synergism. Exemplary examples of synergistic combinations are: saccharin/aspartame; saccharin/potassium acesulfame; saccharin/aspartame/potassium acesulfame. These sweeteners can also be added to the final food confectionery, drug or personal product independently of the delivery system. Thus, a good product may have sweetness imparted thereto attributable to the delivery system sweetness as well as those auxilary sweeteners independent of the delivery system. These combinations of sweeteners have also been discovered to impart a long lasting flavor effect to the food product such as chewing gum.

Useful flavoring agents may be chosen from synthetic flavoring liquids and/or liquids derived from plants, leaves, flowers, fruits and so forth, and combinations thereof. Representative flavoring liquids include: spearmint oil, cinnamon oil, oil of wintergreen (methylsalicylate) and peppermint oils. Also useful are artificial, natural or synthetic fruit flavors such as citrus oil including lemon, orange, grape, lime and grapefruit and fruit essences including apple, strawberry, cherry, pineapple and so forth.

The amount of flavoring agent employed is normally a matter of preference subject to such factors as flavor type, base type and strength desired. In general, amounts of about 0.05% to about 3.0% by weight of the final chewing gum composition are usable with amounts of about 0.3% to about 1.5% being preferred and about 0.7% to about 1.2% being most preferred.

With regard to chewing gum formulations in which the novel delivery system is employed, the amount of gum base employed will vary greatly depending on various factors such as the type of base used, consistency desired and other components used to make the final product. In general, amounts of about 5% to about 45% by weight of the final chewing gum composition are acceptable for use in chewing gum composition with preferred amounts of about 15% to about 25% by weight. The gum base may be any water-insoluble gum base well known in the art. Illustrative examples of suitable polymers in gum bases include both natural and synthetic elastomers and rubbers. For example, those polymers which are suitable in gum bases, include, without litigation, substances of vegetable origin such as chicle, jetutong, gutta percha and crown gum. Synthetic elastomers such as butadiene-styrene copolymers, isobutylene-isoprene copolymers, polyethylene, polyisobutylene and polyvinylacetate and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, such as polymers of alpha-pinene or beta-pinene; terpene resins including polyterpene and mixtures thereof. The solvent may be employed in an amount ranging from about 10% to about 75% and preferably about 45% to about 70% by weight to the gum base.

A variety of traditional ingredients such as plasticizers of softeners such as lanolin, stearic acid, sodium stearate, potassium stearate, glyceryl triacetate, glycerine and the like for example, natural waxes, petroleum waxes, such as polyurethane waxes, paraffin waxes and microcrystalline waxes may also be incorporated into the gum base to obtain a variety of desirable textures and consistency properties. These individual additional materials are generally employed in amounts of up to about 30% by weight and preferably in amounts of from about 3% to about 20% by weight of the final gum base composition.

The chewing gum composition may additionally include the conventional additives of flavoring agents, coloring agents such as titanium dioxide; emulsifiers such as lecithin and glyceryl monostearate; and additional fillers such as aluminum hydroxide, alumina, aluminum silicates, calcium carbonate, and talc and combinations thereof. These fillers may also be used in the gum base in various amounts. Preferably the amount of fillers when used will vary from about 4% to about 30% by weight of the final chewing gum.

In the instance where auxiliary sweeteners are utilized in addition to those in the delivery system, the present invention contemplates the inclusion of those sweeteners well known in the art, including both natural and artificial sweeteners. Thus, additional sweeteners may be chosen from the following non-limiting list, sugars such as sucrose, glucose (corn syrup), dextrose, invert sugar, fructose, and mixtures thereof; saccharine and its various salts such as the sodium or calcium salt; cyclamic acid and its various salts such as the sodium salt; the dipeptide sweeteners such as aspartame; dihydrochalcone compounds, glycyrrhizin; *Stevia Rebaudiana* (Stevioside); and sugar alcohols such as sorbitol, sorbitol syrup, mannitol, xylitol, and the like. Also contemplated as an additional sweetener is the nonfermentable sugar substitute (hydrogenated starch hydrolysate) which is described in U.S. Pat. No. Re. 26,959. Also contemplated is the synthetic sweetener 3,6-dihydro-6-methyl-1-1,2,3-oxathiazin-4-one-2,2-dioxide particularly the potassium (Acesulfame-K), sodium and calcium salts thereof as described in German Patent No. 2,001,017.7.

Suitable flavorings include both natural and artificial flavors, and mints such as peppermint, menthol, artificial vanilla, cinnamon, various fruit flavors, both individual and mixed, and the like are contemplated. The flavorings are generally utilized in amounts that will vary depending upon the individual flavor, and may, for example, range in amounts of about 0.5% to about 3% by weight of the final chewing gum composition weight. The flavorings may be present in the delivery system, in the chewing gum composition itself, or both.

The colorants useful in the present invention, include the pigments such as titanium dioxide, that may be incorporated in amounts of up to about 1% by weight, and preferably up to about 6% by weight. Also, the colorants may include other dyes suitable for food, drug and cosmetic applications, and known as F.D. & C. dyes and the like. The materials acceptable for the foregoing spectrum of use are preferably water-soluble. Illustrative examples include indigoid dye, known as F.D. & C. Blue No. 2, which is the disodium salt of 5,5'-indigotindisulfonic acid. Similarly, the dye known as F.D. & C. Green No. 1, comprises a triphenylmethane dye and is the monosodium salts of 4-[4-N-ethyl-p-sulfobenzylamino)diphenylmethylene]-[1-(N-ethyl-N-p-sulfoniumbenzyl)-2,5-cyclohexadienimine]. A full recitation of all F.D. & C. and D. & C. and their corresponding chemical structures may be found in the Kirk-Othmer Encyclopedia of Chemical Technology, in Volume 5, at Pages 857–884, which text is accordingly incorporated herein by reference.

The chewing gums of the invention may be in any form known in the art, such as stick gum, slab gum, chunk gum, shredded gum, hard coated gum, tabletted gum, as well as center-filled gum.

The process of preparing the inventive chewing gum compositions is as follows. The gum base is melted (about 85° to about 90°), cooled to 78° C. and placed in a pre-warmed (60° C.) standard mixing kettle equipped with sigma blades. The emulsifier is then added and mixed in. Next, a portion of the sorbitol and the glycerin is added and mixed in for an additional 3 to 6 minutes. The mixing kettle is cooled and mannitol and the remainder of the sorbitol and glycerin are then added and mixing is continued. At the time, the unflavored chewing gum temperature is about 39°–42° C. Flavor oil is then added and incorporated into the base and the mixing is continued. Finally, the delivery system containing the sweetener material is added and mixed for an additional 1 to 10 minutes. The delivery system is added as the last ingredient. The final gum temperature is about 39° C.–43° C. The chewing gum composition is then discharged from the kettle, rolled, scored and formed into chewing gum pieces.

More generally, this invention relates to a method of preparing a chewing gum composition having improved sustained sweetener release properties which comprises:

(1) Preparing a sweetener delivery system wherein the sweetener is protected by an encapsulation prepared by the process comprising:

(A) entrapping a sweetener in a polyvinyl acetate coating comprising the steps of melting and blending the polyvinyl acetate with an emulsifier and dispersing the sweetener uniformly therein; cooling the mixture at ambient temperature while continuing to mix; and (B) grinding the resultant mixture to the desired particle size; and (2) Adding the resultant delivery system to a homogeneous mixture of a gum base and remaining chewing gum ingredients; and (3) Forming the resultant mixture into suitable chewing gum shapes.

Optionally, the delivery system particles can be coated with an additional hydrophobic coating comprising a fat or wax blended with an emulsifier. Conventional, fluidized bed techniques can be used for obtaining these additional coatings.

The following examples serve to provide further appreciation of the invention but are not meant in any way to restrict the effective scope of the invention. All percentages throughout the specification are by weight % of the final delivery system unless otherwise indicated.

EXAMPLES

The following compositions A–L are representative of the inventive delivery systems. These compositions were prepared in accordance with the method previously described.

TABLE I

|  | Delivery Systems % by weight | | | | | | | | | | | |
| --- | --- | --- | --- | --- | --- | --- | --- | --- | --- | --- | --- | --- |
|  | A | B | C | D | E | F | G | H | I | J | K | L |
| Aspartame | 5 | 16.67 | 15 | 25 | — | — | — | — | — | — | — | — |
| Saccharin | — | — | — | — | 5 | 10 | 16.7 | 25 | — | — | — | — |
| Acesulfame-K | — | — | — | — | — | — | — | — | 5 | 10 | 15 | 24.67 |
| Glyceryl Monostearate | 2 | 10 | 2 | 15 | 2 | 7 | 10 | 15 | 2 | 7 | 10 | 9.04 |
| PVA | 93 | 63.33 | 75 | 60 | 93 | 83 | 73.33 | 60 | 84 | 83 | 75 | 57.25 |
| Hydrogenated fat or wax | — | 10 | 8 | — | — | — | — | — | 9 | — | — | 9.04 |

Once the delivery systems were prepared, they were further ground to obtain the desired mesh size, i.e., about 30 to about 200 U.S. standard mesh (600-75 microns). A second coating of fat or wax and glycerol monostearate blend was applied on some of the above compositions using conventional fluidized bed granulation techniques. This second coating, although not required, is useful in applications where prolonged exposure to acid pH, water or high temperature is likely. The second coating also assures that rod-like shaped sweeteners such as aspartame are adequately coated.

Each of the inventive delivery systems in Table I were incorporated into the following chewing gum composition and chewing gum product was produced therefrom using conventional processing techniques common to the art.

| Chewing Gum Compositions (% by weight of total composition) | |
| --- | --- |
| Gum Base | 11-45% |
| Polyol (sorbitol, mannitol) | 30-60% |
| Humectant (glycerin) | 8-13% |
| Softener (lecithin) | 0.1-0.5% |
| Delivery System | 0.5-20% |

The resultant chewing gum compositions were then tested using expert chew panels to determine the sweetener release rate as a function of time and preference (liking). FIGS. 1 and 2 graphically depict the chew panel results indicating a significantly higher degree of sweetness liking during the 16 minute chew test.

The chew panels were conducted as a blind study. Panelists were asked to rate "sweetener liking" at intervals of 2, 6, 10 and 15 minutes.

The inventive compositions I-IV (shown below) were compared with a leading brand containing aspartame, as well as other aspartame-containing prior art chewing gums (a, b & c which are taken from compositions taught in U.S. Pat. No. 4,597,970 to Yang).

| Ingredient | Inventive Chewing Gum Compositions - % wt. of Total Composition | | | |
| --- | --- | --- | --- | --- |
|  | I | II | III | IV |
| Gum Base | 26 | 26 | 26 | 26 |
| Sorbitol | 44.7 | 44.7 | 44 | 44 |
| Mannitol | 12 | 12 | 12 | 12 |
| Flavor | 1.5 | 1.5 | 1.5 | 1.5 |
| Glycerin | 13 | 13 | 13 | 13 |
| Lecithin | 0.5 | 0.5 | 0.5 | 0.5 |
| Delivery System C | 2.3 | — | — | — |
| Delivery System D | — | 2.3 | — | — |
| Delivery System J | — | — | — | 2.3 |
| Delivery System L | — | — | 2.3 | — |

FIG. 1 graphically shows the results of chew panels using the inventive aspartame-containing delivery systems C & D in the above formulations I and II. These compositions were compared with a leading aspartame-containing commercial chewing gum. It is apparent from the graph that throughout the 15 minute chew period, the inventive chewing gum compositions were superior in sweetener release perceived as compared to the leading commercial brand.

FIG. 2 shows inventive chewing gum compositions II and IV which have acesulfame-K as the encapsulated sweetener. Comparative chewing gums having substantially the same formula but containing free acesulfame-K were also tested, as were three prior art compositions (a,b,c) using the delivery system of U.S. Pat. No. 4,597,970. It is clear from the results that the inventive compositions were perceived by panels as significantly better in delaying the sweetener release throughout the test period when compared to the release characteristics of the prior art compositions.

We claim:

1. A chewing gum composition having prolonged sweetness duration comprising a gum base and a stable sweetener delivery system capable of effecting a controlled release of the sweetener consisting essentially of:
   A. at least one solid natural or artificial high intensity sweetener present in amounts of about 0.01% to about 50% by weight of the sweetener delivery system and selected from the group consisting of amino acid-based sweeteners, dipeptide sweeteners, glycyrrhizin, saccharin and its salts, acesulfame salts, cyclamates, steviosides, talin, dihydrochalcone compounds and mixtures thereof; and
   B. an emulsifier present in amounts of about 0.5% to about 20% by weight of the sweetener delivery system and selected from the group consisting of lecithin, esters of stearates, esters of palmitates, esters of oleates, esters of glycerides, sucrose polyesters, polyglycerol esters, and mixtures thereof; and
   C. polyvinyl acetate present in amounts of about 40% to about 93% by weight of the sweetener delivery system and having a molecular weight of about 2,000 to about 14,000.

2. The chewing gum composition of claim 1 wherein the sweetener comprises aspartame in the amount of about 0.01% to about 50% by weight of the delivery system.

3. The chewing gum composition of claim 1 wherein the sweetener comprises saccharin and its salts in the amount of the 0.01% to about 50% by weight of the delivery system.

4. The chewing gum composition of claim 1 wherein the sweetener is a combination of up to about 25% of aspartame and about 1.0% to about 50% of saccharin and its salts by weight of the delivery system.

5. The chewing gum composition of claim 4 wherein the sweetener additionally contains about 0.01% to about 50% by potassium acesulfame by weight of the delivery system.

6. The chewing gum composition of claim 1 wherein the emulsifier is glyceryl monostearate present in amounts of about 2% to about 15% by weight of the delivery system.

7. The chewing gum composition of claim 1 wherein the polyvinyl acetate has a molecular weight range of about 2,000 to about 12,000.

8. The chewing gum composition of claim 7 wherein the polyvinyl acetate is blended with a material selected from the group consisting of resins, rosins, terpenes, elastomers, waxes and mixtures thereof.

9. The chewing gum composition of claim 1 wherein the gum base comprises an elastomer selected from the group consisting of natural rubber, synthetic rubber and mixtures thereof.

10. The chewing gum composition of claim 9 wherein the gum base elastomer is selected from the group consisting of chicle, jelutong, balata, gutta-percha, lechicapsi, sorva, butadient-styrene copolymers, polyisobutylene, isobutylene-isoprene copolymers, polyethylene, polyvinylacetate, and mixtures thereof.

11. The chewing gum composition of claim 10 wherein the gum base is present in amounts of about 5% to about 45% by weight of the final chewing gum composition.

12. The chewing gum composition of claim 1 wherein there is additionally included fillers, coloring agents, flavoring agents, softeners, plasticizers, elastomers, elastomer solvents, sweetening agents and mixtures thereof.

13. The chewing gum composition of claim 1 wherein the sweetener delivery system also contains a wax material selected from the group consisting of animal waxes, vegetable waxes, synthetic waxes, petroleum wax and mixtures thereof.

14. A method of preparing a chewing gum composition having improved sustained sweetener release properties which comprises:
  (1) Preparing a sweetener delivery system wherein the sweetener is protected by a matrix coating prepared by the process comprising:
    (A) entrapping a sweetener in a polyvinyl acetate coating comprising the steps of melting and blending the polyvinyl acetate with an emulsifier and dispersing the sweetener uniformly therein; cooling the mixture to ambient temperature while continuing to mix;
    (B) grinding the resultant mixture to the desired particle size;
  (2) Adding the resultant delivery system to a homogeneous mixture of a gum base and remaining chewing gum ingredients; and
  (3) Forming the resultant mixture into suitable chewing gum shapes.

15. A method of preparing a delivery system useful for delivering sweeteners comprising the steps of:
  (A) entrapping a sweetener in a polyvinyl acetate coating by melting and blending a low molecular weight polyvinyl acetate with an emulsifier and dispersing the sweetener uniformly therein; cooling the mixture to ambient temperature while continuing to mix; and
  (B) grinding the resultant mixture to the desired particle size; and
  (C) optionally coating the particles formed in (B) with a hydrophobic mixture comprising a fat or wax blended with an emulsifier to form an additional protective layer on the delivery system particles.

* * * * *